United States Patent Office

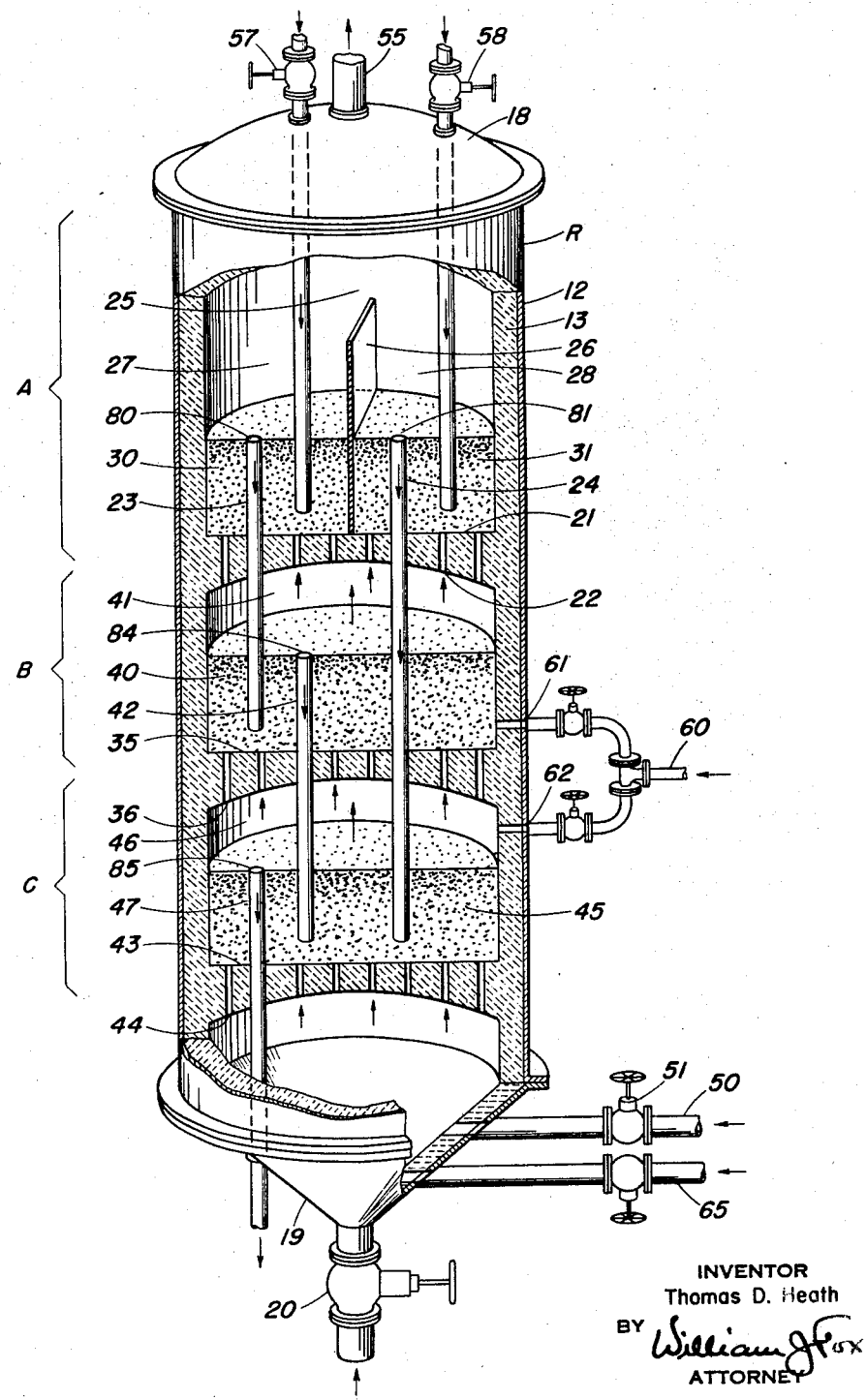

2,890,106
Patented June 9, 1959

2,890,106

APPARATUS FOR HEAT TREATING FLUIDIZED SOLIDS

Thomas D. Heath, Westport, Conn., assignor to Dorr-Oliver Incorporated, a corporation of Delaware Original application January 19, 1951, Serial No. 206,879, now Patent No. 2,749,218, dated September 8, 1955. Divided and this application August 30, 1955, Serial No. 531,448

3 Claims. (Cl. 23—284)

This invention relates generally to the art of treating ore solids in fluidized bed reactors and particularly to process and apparatus for temperature control within such reactors combined with the utilization of heat added thereto or generated therein.

In the process for treating iron ore wherein certain of its iron-bearing constituents and especially its ferric-oxide constituents are reduced or converted to magnetite, use is frequently made of a multi-zoned reactor or furnace in which the so-called fluidized bed technique is utilized. A typical example of such a process is to be found in my United States Patent 2,477,454, which covers the reduction of the ferric-oxide constituents of iron ore to magnetite in a multi-zoned fluidized bed reactor wherein the degree of reduction is controlled by the composition of the reducing gas used while the heat content of the gas is used to preheat incoming ore particles.

When such a process is employed wherein it is necessary to add heat, care must be exercised to efficiently utilize this added heat lest excessive costs arise.

The added heat is normally obtained by burning gas in a combustion zone. If this gas is not completely burned in this zone then its residual heat content is carried out of the reactor and lost. Complete combustion of this gas results in heating the ore particles to temperatures greatly in excess of those required to carry out the desired reduction reaction; however, such excessive temperatures are required to insure complete combustion of the gas. The result is that either the finally reduced ore particles, as discharged from the reactor, contain a needless excess of sensible heat units, or the combustible gases are not consumed and are thus wasted.

So it is one object of this invention to provide ways and means for more efficiently utilizing this added heat by the complete combustion of the gas while yet preventing the loss of sensible heat units in the discharged ore particles. By thus utilizing the added heat a greater fuel economy is obtained and this economy is still another object of this invention.

In such a process where heat is added there is a further problem, namely that of providing independent control of the temperatures of the various beds. For instance, where the ore is heated in a combustion zone by burning gas therein and the heated ore particles discharged to a reduction zone, the temperature of the bed in the reduction zone is directly dependent upon the temperature of the bed in the combustion zone. It is therefore a further object of this invention to provide a method for simultaneously independently controlling the temperatures of the beds in both the combustion zone and the reduction zone.

The objects of this invention, namely the more efficient utilization of the added heat combined with the independent control of the temperatures of the various beds, are attained by using the added heat to excessively heat a portion of the incoming ore solids prior to treatment; then commingling this excessively heated portion with a portion of relatively cooler solids to produce a resulting mixture having a temperature lower than that of the excessively heated ore solids yet within the temperature range required for the desired reduction of the ore. The result is that a much greater amount of the added heat is retained for use in the reactor, and the temperature of the beds in the combustion and reducing zones are no longer directly dependent upon each other.

Summarizing, this invention contemplates the heat treating of ore solids in a reactor having a plurality of superposed fluidized beds of which one is in a combustion zone and a subjacent one is in a reduction zone, wherein a portion of the incoming ore solids are excessively heated in a bed in the combustion zone then discharged to a bed in the reduction zone to commingle therein with a portion of relatively cooler ore solids, and the temperatures of the various beds as well as the sensible heat content of the reduced ore solids are controlled by regulating the quantity of ore solids in each of the portions so commingled.

Before presenting a detailed description of the apparatus and process invention hereof it will be advisable to discuss the general nature and operation of fluidized bed reactors as referred to herein.

In general, in the fluidized bed technique for treating solids a bed of subdivided solid particles is maintained as a dense homogeneous suspension behaving like a turbulent liquid and exhibiting a fluid level. This is accomplished by passing through the bed an uprising stream of gas at a velocity sufficient to considerably expand the depth of the bed as well as to maintain its particles in turbulent suspension in the uprising gas stream, but at a velocity insufficient to cause the gas to entrain and carry out of the reactor any substantial quantity of solid particles. Under such conditions the bed is called a fluidized bed. The fluid level of this fluidized bed is maintained by the use of a spill-pipe or overflow arrangement so that as more solid particles are introduced into the bed the resulting increased depth causes the particles to overflow down through the spill-pipe just as a fluid does.

In a reactor having a plurality of zones, several superposed beds are simultaneously maintained in such a fluidized state. Each fluidized bed is usually a separate distinct treatment stage. The treated solid particles from a superjacent bed are discharged or allowed to overflow to a subjacent bed for further treatment then overflowed to the next subjacent bed for even further treatment, etc. This process continues until the particles have passed through all of the fluidized beds after which they are discharged from the reactor.

Due to the turbulent nature of the fluidized beds, heat exchange by and among the particles thereof is almost instantaneous so that if two portions of particles, each at a different temperature from the other, are commingled in a fluidized bed the resulting mixture will almost instantly assume a temperature intermediate the temperatures of the portions commingled. Further, this rapid heat exchange creates a substantially uniform temperature throughout the bed.

A reactor having a plurality of superposed fluidized beds is generally employed to reduce the ferric-oxide constituents of iron ore to magnetite. The fluidized beds are so arranged that the uppermost bed is in a preheating zone, the next subjacent bed is in a combustion zone, while the lowermost bed is in a zone maintained under reducing conditions and where the reducing reaction requires elevated temperatures. The reduction is effected by passing a combustible reducing gas in excess of that required for reduction upwardly through the heated lowermost bed without combustion after which the residual gas passes upwardly through the superjacent beds.

The heat for the reaction is obtained by burning the residual combustible constituents of this uprising gas in the superjacent combustion zone to heat the ore particles of the bed therein by exposing them predominantly to liberated latent heat. The sensible heat content of the gaseous combustion products is then utilized to preheat the incoming ore solids in the superjacent preheating zone. The process is made continuous by continuously feeding ore particles to the upper bed, overflowing the solid ore particles to the subjacent combustion and reduction zones, and finally to discharge.

In the process thus described it has been found that although the added heat is utilized to heat the incoming ore particles prior to reduction treatment, nevertheless heat waste occurs due to the heating of all of the ore particles to the temperature required for complete combustion of the gas in the combustion zone. This results in needlessly high temperatures in the reduction zone so that the finally discharged reduced ore contains a needless excess of sensible heat units. Further, the temperature in the reduction zone is directly dependent upon the temperature in the combustion zone so that independent temperature control of the beds becomes difficult or impossible without resort to outside means.

The best embodiment of the invention now known to me has been selected for the purpose of illustration, but it is to be understood that it is illustrative only and not limiting for obviously changes in arrangement, construction and detail can be made without departing from the scope of the invention as defined by the appended claims, bearing in mind however that their requirements include equivalents thereof.

In the drawing, the figure is a vertical view of a preferred structure embodying my invention.

In the figure the total assembly, called a reactor R, is preferably a vertical cylinder made up of zones such as A, B and C suitably secured together, each having a metal outer wall 12, lined with insulation and firebrick 13. The reactor has a top 18, and a coned bottom 19 provided with a valved outlet 20. Zone A is provided with a constriction plate 21 having a plurality of orifices such as that one shown at 22. The plate extends across the reactor throughout its cross-sectional area and is adapted to hold thereon a bed of fluidized ore being heated by heat transfer, above which is a freeboard space 25. This zone A is also provided with a plate or other partitioning means 26 which divides the fluidized bed as well as a portion of the freeboard space 25 into two chambers 27 and 28 so that each chamber contains its own bed of fluidized ore being heated, these beds are numbered 30 and 31. Zone B has a similar constriction plate 35 with orifices such as at 36 and is adapted to hold a bed, 40, of fluidized ore being treated above which is a freeboard space 41. Zone C has a further constriction plate 43 with orifices such as 44, and is adapted to hold a bed 45 of fluidized or being reduced, above which is a freeboard space 46. Zone A is a preheating zone, zone B a combustion zone, and zone C a reducing zone.

The fluidized beds 30 and 31 in zone A have their fluid-levels controlled by the entrances 80 and 81 to conduits or spill-pipes 23 and 24 respectively. The overflowing ore from bed 30 drops through conduit 23 into bed 40 in the subjacent zone B while overflowing ore from bed 31 drops through conduit 24 directly into bed 45 in zone C. The fluid-level of bed 40 in zone B is similarly controlled by the entrance 84 to a conduit or spill-pipe 42 through which the overflowing ore particles drop into bed 45 in zone C. Similarly, the fluid-level of bed 45 in zone C is controlled by entrance 85 into conduit or spill-pipe 47 down through which reduced ore passes to discharge.

A combustible reducing gas is supplied to the reactor through an inlet pipe 50 at the bottom thereof suitably valved as at 51. The velocity of supplied gas is sufficient to fluidize the ore particles in all of the beds. Exhaust gases pass upwardly through conduit 55 and leave the reactor. Ore to be treated in the reactor is supplied to beds 30 and 31 through suitably valved conduits 57 and 58 respectively.

In order to supply air, when needed, to the intermediate zone B for maintaining it as a combustion zone, there is provided an air supply pipe 60 leading into the reactor at 61 or 62 as desired where the incoming air is intermingled with the uprising gas stream in order to support the combustion thereof.

A pipe 65, suitably valved and provided with a burner, is supplied to the bottom of the reactor to supply fuel for starting up; however, any type of preheating torch can be used. Usual means can be provided for temperature and pressure readings in the various beds or zones, but are omitted from the drawings to avoid unnecessarily complicating them. Whereas I have shown conduit or spill-pipe 24 as passing through zone B, it is to be understood that other arrangements may be desirable. For instance, the conduit may lead from bed 31 to a point outside the reactor, thence to bed 45. Other arrangements will appear to those skilled in the art.

The location of partition 26 in zone A is not fixed, but may vary according to either or both the reactor design and the reaction being carried out. In general, I have found it desirable to locate partition 26 so that the cross-sectional areas of beds 30 and 31 are in direct proportion to the quantity of ore passing through them, that is, if bed 30 occupies 60% of the cross-sectional area of zone A then 60% of the total feed enters through conduit 57. Also entrance to conduits 23 and 24 are located at equal distances above constriction plate 21 so that the depths of beds 30 and 31 are substantially equal. However, this is not critical so long as care is taken to insure that both beds remain fluidized. The other factors also may vary, that is, even though bed 31 occupies only 40% of zone A, it may be desirable to feed 60% of the total incoming ore to this bed so that an increased quantity may overflow through conduit 24 to bed 45 in order to maintain the desired temperature there. It may also be desirable to insulate conduit 24, or to locate it so that it does not pass through zone B at all. Variations of this nature will be made as dictated by local conditions.

In starting up the reactor R heat is supplied initially by burning fuel supplied through pipe 65, while the beds are established and maintained by continuously feeding ore into beds 30 and 31 through conduits 57 and 58 respectively from which the ore flows downwardly into the subjacent beds 40 and 45 through conduits 23, 24 and 42. Fluidizing and reducing gases are introduced through pipe 50, and combustion supporting gas or air is introduced through pipe 60.

When the reactor is in full and continuous operation, zone B is the hottest zone and is where combustion takes place. Here the temperature must be maintained high enough so that substantially complete combustion of the gas takes place therein. In zone C where reducing conditions are maintained, the ore of bed 45 must be kept at a temperature sufficient to carry out the desired reduction. This temperature is lower than the temperature of combustion zone B. Ore in beds 30 and 31 of zone A is preheated by the heat rising from zone B, so the ore in these beds is preheated by sensible heat. Ore from bed 30 overflows through conduit 23 into bed 40 where it is subjected to latent heat of combustion predominantly and its temperature is maintained at the temperature required for combustion of the uprising gases as well as above the temperature required in subjacent bed 45. These heated ore particles overflow through conduit 42 into subjacent bed 45. Ore from bed 31 overflows through conduit 24 into bed 45 where it mixes with the relatively hotter ore particles from bed 40. The temperature of bed 45 in reducing zone C is controlled by regulating the quantity of ore particles entering the latter bed from beds 31 and 40 respectively.

Example I

The process of this invention was used to reduce the ferric-oxide constituents of a low grade red Alabama Hematite iron ore to magnetite. The fuel used was a locally available, naturally-occurring, combustible gas which was reformed in a generator to increase its reducing potential. As it left the generator, this gas was at a temperature of substantially 1100° C. and had a composition of substantially 12.3% $H_2$, 8.6% CO, 1.4% $CH_4$, 4.5% $CO_2$, 13.9% $H_2O$ and 59.3% $N_2$. This gas also served as the fluidizing gas. The gas was introduced first into the reduction zone where its reducing properties acted on the ore therein to reduce the ferric-oxide constituents to magnetite. Following this the gas was flowed to a combustion zone where the remaining combustible constituents were substantially completely combusted to liberate heat; the resulting heated gases were then flowed to a preheating bed where they preheated ore solids by transfer of sensible heat units. All of the incoming ore solids were preheated in the preheating zone, but only 45.7% of these preheated solids were discharged to the combustion zone to be further heated by exposure to the liberated heat therein. These heated solids were then discharged to the reduction zone. The remaining 54.3% of the total incoming solids were discharged directly from the preheating zone to the reduction zone where they mixed with the solids from the combustion zone. The solids in the reducing zone were maintained at a temperature of substantially 650° C., while the solids in the combustion zone were maintained at substantially 800° C. in order to insure complete combustion of the gas in that zone. As a result, the temperature of the solids in the preheating zone was substantially 220° C. The temperature of the solids in the reduction and combustion zones was controlled by regulating the relative quantity of incoming ore solids delivered to the beds in those zones. In this case the quantities were as outlined above, namely 45.7% of total incoming solids were heated in the combustion zone while the remaining 54.3% by-passed that zone.

By using this process in the manner described I was enabled to carry out the desired reduction with a relatively low heat input of approximately 1,190,000 B.t.u.'s per ton of ore treated. This figure represents a substantial decrease in heat input over any of the prior art processes and this saving is a direct result of my invention which retains and utilizes a much greater quantity of the added heat.

This application is a division of my co-pending application Serial No. 206,879, filed January 19, 1951, now U.S. Patent 2,749,218.

I claim:

1. Apparatus for conducting fluidized reactions, comprising a reactor having a plurality of superposed zones including an upper zone and an intermediate zone as well as a lower zone, perforated plates fixedly positioned at the bottom of each zone for supporting solids thereon while yet admitting the passage of a stream of uprising gas therethrough, vertical partitioning means superposed on the perforated plate of the upper zone to divide the cross-sectional area of such plate as well as a portion of the space overlying it into two chambers each capable of holding solids, valved conduit means for controllably introducing fluidizing treatment gas into the reactor at the bottom thereof, valved conduit means for controllably introducing combustion supporting gas into the reactor in order to support combustion in the intermediate zone, valved conduit means for introducing fuel to the reactor during initial heating, conduit means for discharging gases from the reactor, conduit means for overflowing solids from the lower zone to discharge, conduit means for overflowing solids from one chamber of the upper zone to the intermediate zone, conduit means for overflowing solids from the other chamber of the upper zone directly to the lower zone, conduit means for overflowing solids from the intermediate zone to the lower zone, and valved conduit means for introducing a controlled quantity of solids into each of the chambers of the upper zone whereby the relative quantities of solids received in the lower zone from the intermediate and upper zones may be controlled.

2. Apparatus for conducting fluidized reactions, comprising a reactor having a plurality of superposed zones including an upper zone and an intermediate zone as well as a lower zone, perforated plates fixedly positioned at the bottom of each zone for supporting solids thereon while yet admitting the passage of a stream of uprising gas therethrough, vertical partitioning means superposed on the perforated plate of the upper zone to divide the cross-sectional area of such plate as well as a portion of the space overlying it into two chambers each capable of holding solids, valved conduit means for controllably introducing fluidizing treatment gas into the reactor at the bottom thereof, conduit means for discharging gases from the reactor, conduit means for overflowing solids from the lower zone to discharge, conduit means for overflowing solids from one chamber of the upper zone to the intermediate zone, conduit means for overflowing solids from the other chamber of the upper zone directly to the lower zone, conduit means for overflowing solids from the intermediate zone to the lower zone, and valved conduit means for introducing a controlled quantity of solids into each of the chambers of the upper zone.

3. Apparatus according to claim 2 in which said vertical partition means in said upper zone is selectively positioned with respect to the cross-sectional area of said upper zone to provide chambers of differing volumes in relationship to each other.

References Cited in the file of this patent

UNITED STATES PATENTS

| | | |
|---|---|---|
| 2,425,098 | Kassel | Aug. 5, 1947 |
| 2,477,454 | Heath | July 26, 1949 |
| 2,513,995 | Eastwood | July 4, 1950 |